Figure 5:
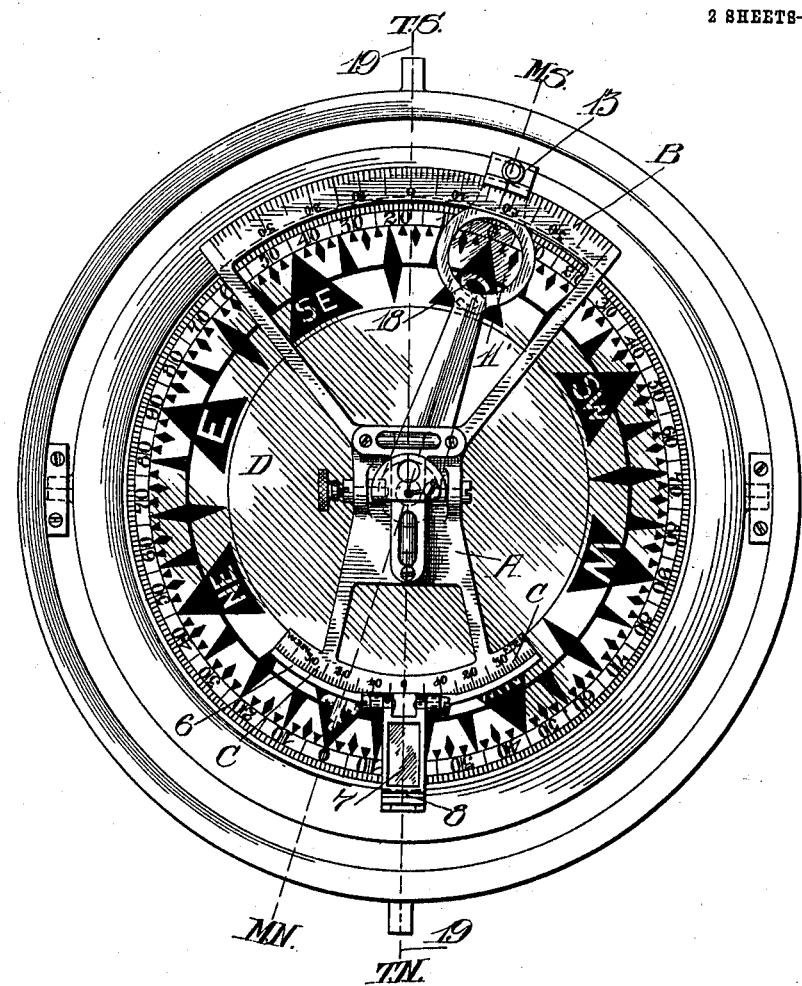

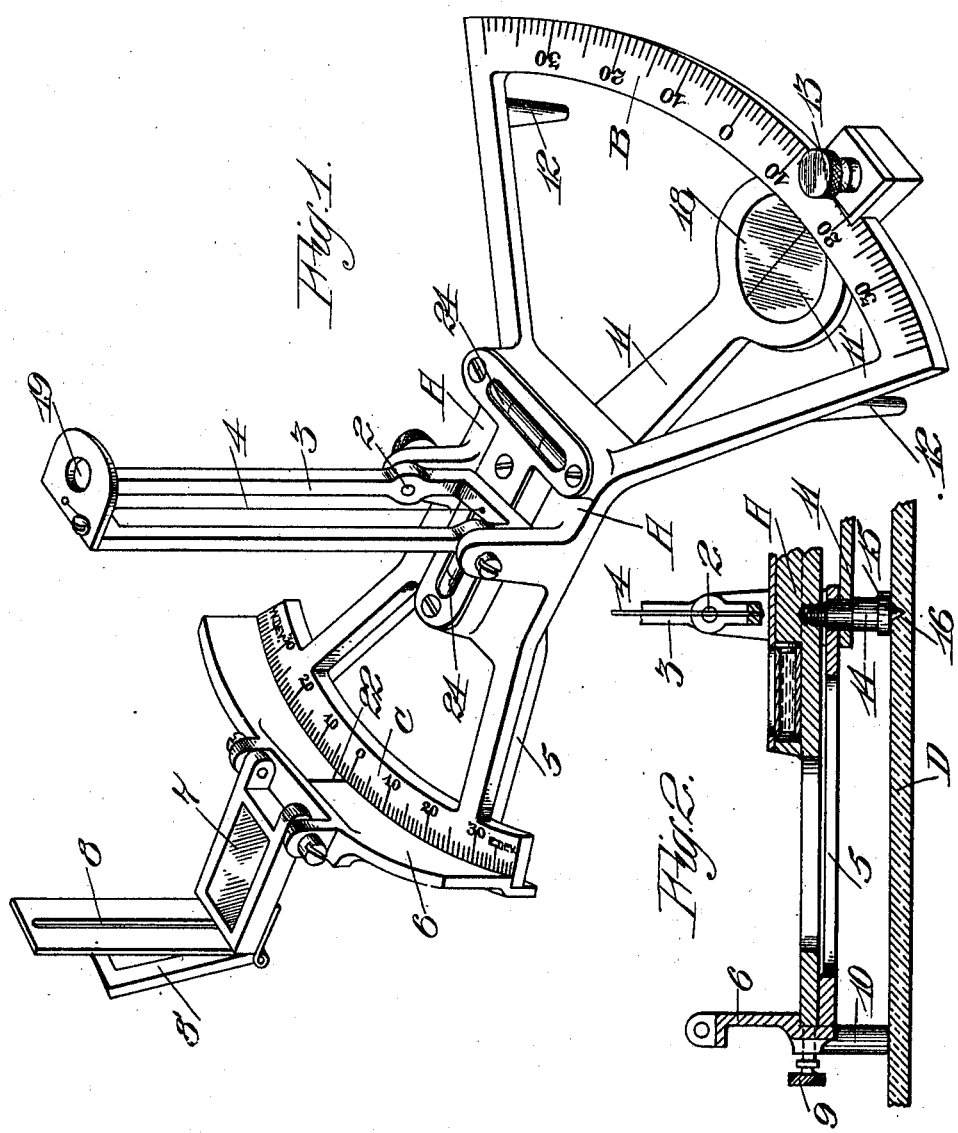

A. F. H. WEULE.
AZIMUTH INSTRUMENT.
APPLICATION FILED MAR. 30, 1910.

978,093.

Patented Dec. 6, 1910.

2 SHEETS—SHEET 2.

WITNESSES:

INVENTOR

UNITED STATES PATENT OFFICE.

ARTHUR F. H. WEULE, OF SAN FRANCISCO, CALIFORNIA.

AZIMUTH INSTRUMENT.

978,093.  Specification of Letters Patent.  Patented Dec. 6, 1910.

Application filed March 30, 1910. Serial No. 552,343.

*To all whom it may concern:*

Be it known that I, ARTHUR F. H. WEULE, citizen of the United States, residing in the city and county of San Francisco and State of California, have invented new and useful Improvements in Azimuth Instruments, of which the following is a specification.

This invention relates to azimuth instruments.

As is known, great difficulty is sometimes connected with the use of mariners' compasses, arising from disturbing influences of the magnetism of the ship. The difficulty is particularly felt in iron vessels where the deviation of the needle is frequently so considerable as to render the compass almost useless. This difficulty is particularly felt where the ship's course runs in such a direction that the latitude changes considerably, as from North American ports to Australia. The magnetism of the vessel changing with the magnetic latitude causes an ever-varying deviation of the needle. This deviation of the needle may be either east or west of the true magnetic north and on almost all ships varies several degrees. It is most necessary for the navigator to determine the deviation at different times, and for this purpose several instruments have been constructed. None of these instruments I consider very practical, and know of none in which a direct reading of the deviation can be taken. With this in view, I have constructed an instrument of which the following is a complete description, in which, Figure 1 is a perspective view of the instrument. Fig. 2 is a vertical, approximately central, partial section in a plane radial approximately to the segment, C, and parallel with the vertical wire, 4. Fig. 3 is a plan view of a compass showing the instrument in position.

Referring to Fig. 1, the instrument consists of a horizontal main frame portion A, having the two graduated segmental end portions B and C. At the center of this frame is pivoted at 2 a vertically disposed foldable frame 3 carrying the sight wire 4. On the underside of the end C, and pivoted centrally of the main frame, is a supplementary horizontal frame 5 having a vertical segmental flange 6. On the upper edge of flange 6 is pivoted a reflecting mirror 7, sight frame 8, and sighting mask 8'. The supplemental frame 5 is also provided with a clamp screw 9, for locking it to the segment C, and has a supporting leg 10. Segment B also has two legs 12 for supporting the azimuth instrument on the compass glass D. Pivoted below the frame 5 is the pointer frame 11, carrying the magnifier 11' and cross hair 18, and screw clamp 13 for locking the pointer frame 11 to segment B. The frames 5 and 11 are held in place by the center pin 14, and may swing independently in any direction on this pin. The pin is provided with a center point adapted to engage a center hole 16 in the compass glass D. The two segmental portions B, C are graduated, beginning at the center with 0° to 30° or 40° on each side. The instrument may also be provided with level glasses, as at 24, so that the horizontal position of the instrument can be determined.

Referring to Fig. 3 of the drawings, the dotted line 19 represents the true north and south line, or a line of shade thrown by the sun when at its meridian. To determine the correctness of a compass it is necessary for the navigator to know the exact variation when at a certain latitude and longitude. Charts are provided giving the variations at different longitudes and latitudes. For example, at San Francisco the variation between true north and magnetic north is approximately 18°, and at different points along the North Pacific coast and Alaska the variation runs over 30°. These variations are, as before stated, found on the charts provided for that purpose.

In operation the navigator knowing the variation, say in San Francisco Bay, to be 18° (actually about 17° 30′ E.) will move the pointer frame 11 until the cross hair 18 on the magnifier registers with 18° on the segment B. The vertical frame 3 is provided with a sighting piece 19 through which the operator may sight on line 20 to set the cross hair 18 on the pointer frame in the correct position; in this case 18°. The screw clamp 13 is then tightened so that the pointer frame is locked at the position indicating 18°. The instrument is then placed on the compass, care being taken that the center point engages with the center hole of the compass glass. The instrument is then swung around into such a position that the cross hair stands in a line directly above 0° south, as shown in Fig. 3. At this particular position the instrument has been set for apparent noon at that place. Now if the compass is correct and the sun is at its meridian, the wire 4 in frame 3 will throw a line of shade directly across 0° on segment C. If the compass is not correct, the shadow of wire 4 will fall either to one side or the other of 0°, indicating that the compass has so many degrees easterly or westerly deviation, whichever the case may be. The vertical segmental portion of the frame 5 may be enameled white or any other suitable color to show the shade line thrown by the wire 4 on frame 3. It can thus be seen that a direct reading is made indicating the deviation of the compass, something not accomplished by any instrument heretofore.

Sometimes it is desirable to make the compass correction at night by the position of some known fixed star, as the North Star. In this case it is necessary to sight through the slot in the sighting frame 8, bringing the cross wire 4 in line with the star, thus giving the true north and south. The sighting frame and reflecting mirror being pivoted may be turned at any angle most suitable for the operator.

The instrument is placed, as previously described, with the cross hair 18 on the pointer frame directly above south on the compass. It is then necessary to swing the supplementary frame around on its pivot until a line can be taken through the sighting frame and cross wire 4 to the star. The vertical portion is marked in the center, as shown at 22. If this line, being in line with the sighting frame, registers 0° on the graduated segment C, the compass is correct. If the line 22 registers east or west of 0° it indicates the compass to have so many degrees deviation east or west.

It will be understood that the instrument may be used in different ways, as with azimuth compasses and dials. The compass being mounted on gimbals, it can be seen that the swinging or swaying of the ship will not affect the instrument.

The slotted sight frame 8 and mirror may also be used on cloudy days and if the sun is only partially obscured by clouds or haze so that it is too dull to cast a proper shadow on the whitened wall of the flange 6, and yet is too strong when reflected in the mirror for the operator's eyes, the mask 8′ may be turned up so that the operator can peep through the colored glass of the mask and the slot and sighting frame 8 and make his proper adjustments.

Having thus described my invention, what I claim and desire to secure by Letters-Patent, is:

1. An azimuth instrument consisting of a frame with segmental graduated ends in a horizontal plane, said sections having a common center, a vertically disposed sight wire located at said center in a plane at right angles to the plane of said end segments, and a movable member pivoted concentrically with the end segments and having a radial cross-hair arranged in a plane coincident with said sight wire, and a frame turnable on horizontal pivots and carrying said sight wire.

2. An azimuth instrument consisting of a frame with segmental graduated ends in a horizontal plane, said sections having a common center, a vertically disposed sight wire arranged at said center in a plane at right angles to the plane of said end segments, a supporting frame for the sight wire, a movable member pivoted concentrically with an end segment and having a vertical flange concentric with said end segment.

3. An azimuth instrument consisting of a frame with segmental graduated ends in a horizontal plane, said sections having a common center, a vertically arranged sight wire disposed at said center in a plane at right angles to the plane of said end segments, means for supporting said sight wire, a movable member pivoted concentrically with the end segments and having a radial cross-hair arranged in a plane coincident with said sight wire, a movable member pivoted concentrically with the end segments and having a vertical flange, a mirror carried by the flange and a vertically slotted sight member on the mirror with a slot in the plane of said sight wire.

4. An azimuth instrument consisting of a frame with segmental graduated ends in a horizontal plane, said sections having a common center, a vertically arranged sight wire disposed at said center in a plane at right angles to the plane of said end segments, means for supporting said sight wire, a movable member pivoted concentrically with the end segments and having a radial cross-hair arranged in a plane coincident with said sight wire, a second movable member pivoted concentrically with said end segments and having a flange, a mirror carried by the flange, a vertically slotted sight member on the mirror with a slot in the plane of said sight wire, and a mask for said slotted sight member.

5. An azimuth instrument consisting of a frame having two end segments having a common center and each segment graduated from its middle to each side, a sight wire disposed at said center in a plane at right angles to the plane of the segments, means for supporting said sight wire, a frame adapted to swing under one of said segments and having means for locking it thereto and carrying a radial cross-hair which is arranged in the same plane as the sight wire, and a flange concentric with the other end segment and projecting thereabove and having a graduation mark alinable with the graduations on said end segment.

6. An azimuth instrument consisting of a frame having two end segments with a common center and each segment graduated from its middle to each side, a sight wire disposed at said center in a plane at right angles to the plane of the segments, means for supporting said sight wire, a frame adapted to swing under one of said segments and having means for locking it thereto and carrying a radial cross-hair which is arranged in the same plane as the sight wire, a flange concentric with the other end segment and projecting thereabove and having a graduation mark alinable with the graduations on said end segment, and means whereby said flange is mounted to swing in an arc concentric with its end segment.

7. An azimuth instrument consisting of a frame having two end segments with a common center, each segment being graduated from its middle to each side, a sight wire disposed at said center in a plane at right angles to the plane of the segments, means for supporting said sight wire, a frame adapted to swing under one of said segments and having means for locking it thereto and carrying a radial cross-hair which is arranged in the same plane as the sight wire, a flange concentric with the other end segment and projecting thereabove and having a graduation mark alinable with the graduations on said end frame, means whereby said flange is mounted to swing in an arc concentric with its end segment, and a mirror and slotted sight member carried by the flange and adapted to co-act with said sight wire when the instrument is used.

8. An azimuth instrument consisting of a frame having two end segments with a common center, each segment being graduated from its middle to each side, a sight wire disposed at said center in a plane at right angles to the plane of the segments, and a frame adapted to swing under one of said segments and having means for locking it thereto and carrying a radial cross-hair which is arranged in a plane coincident with the sight wire, and a slotted frame pivoted on horizontal pivots at a point proximate to the radial center of the two segments, and carrying said sight wire.

In testimony whereof I have hereunto set my hand in the presence of two subscribing witnesses.

ARTHUR F. H. WEULE.

Witnesses:
   EMIL GINGG,
   M. V. COLLINS.